Nov. 10, 1970   J. HAVEL   3,539,927
SYSTEM FOR AND METHOD OF GENERATING A RANDOM INDEPENDENT
SEQUENCE OF TWO TYPES OF PULSES
Filed May 31, 1967   3 Sheets-Sheet 1

INVENTOR.
Jan Havel
BY
Richard [signature]
Ag't.

INVENTOR.
Jan Havel

United States Patent Office 3,539,927
Patented Nov. 10, 1970

3,539,927
SYSTEM FOR AND METHOD OF GENERATING A RANDOM INDEPENDENT SEQUENCE OF TWO TYPES OF PULSES
Jan Havel, Prague, Czechoslovakia, assignor to Ceskoslovenska akademie ved, Prague, Czechoslovakia
Filed May 31, 1967, Ser. No. 642,533
Claims priority, application Czechoslovakia, June 1, 1966, 3,703/66
Int. Cl. H03k 5/00, 5/13
U.S. Cl. 328—61                            5 Claims

ABSTRACT OF THE DISCLOSURE

A first branch of a pulse generator system provides a random binary sequence of two types of pulses at a determined repetition rate. A second branch of the pulse generator system provides a random binary sequence of two types of pulses at the determined repetition rate. The first and second branches are in parallel relation with each other. A switch interconnects the first and second branches in a manner whereby in one operating condition of the switch each of the first and second branches functions independently of the other to provide corresponding random binary sequences of two types of pulses. In another operating condition of the switch, the first and second branches are combined to provide a random binary sequence of two types of pulses at twice the determined repetition rate.

BACKGROUND OF THE INVENTION

Field of the invention

The present invention relates to a system for and method of pulse generation. More particularly, the invention relates to a system for and method of generating a random independent sequence of two types of pulses.

Description of the prior art

A system for and method of generating a random independent sequence of two types of pulses are described in a technical paper entitled "Herstellung von Zufallszahlen auf Rechenautomaten" by Sebastian von Hoerner, Zamp, 1957, volume VIII, pages 22 to 52. In the von Hoerner system, pulses occurring at random in time in a determined interval are added together or combined and the number of pulses is determined. If the number of pulses is even, the system provides an output pulse of a first determined type such as, for example, a binary pulse or "1." If the number of pulses is odd, the system provides an output pulse of a second determined type such as, for example "0." In order to insure that the probability of occurrence of a pulse of one type is the same as the probability of occurrence of a pulse of the other type, so that the probability of occurrence of a type of pulse is 0.5 or 50%, two requirements must be satisfied. The first requirement is that the determined interval during which the pulses are added and which is known as the counting interval, be of sufficient duration. The second requirement is that the blocking interval, during which no information pulses are supplied to the counting circuit, be of minimum duration. The blocking interval separates adjacent counting intervals or pulses.

It is difficult to satisfy the second requirement, because determined minimum spaces must be maintained between adjacent counting intervals or pulses, so that the duration of the blocking interval may not be arbitrarily decreased. A counting interval or pulse is succeeded by a blank or non-counting first safety space or interval, which is followed by a clearing or reset interval or space. The reset interval is followed by a blank third safety space or interval. The next succeeding or adjacent counting interval or pulse follows the third safety space.

If a repetition frequency of the sequence of two types of pulses provided at the output of the system, or the frequency of counting and blocking intervals, is assumed to be 50 kilocycles per second, the total or combined duration of the counting and blocking interval is 20 microseconds. The minimum safety duration of the blocking interval is then 8 microseconds, so that the ratio between the blocking and counting interval is 0.67 and the blocking interval is 8/20 or 40% of the combined duration of the counting and blocking intervals. Thus, 40% of the total information is lost during the blocking interval and it is complicated and difficult to regain the lost information. The difficulty is due to the repetition frequency when the counting interval is of sufficient duration in accordance with the aforementioned first requirement. An unsatisfactory ratio between the blocking interval and the counting interval becomes even more unsatisfactory as the repetition frequency increases. In order to increase the repetition frequency of the sequence of two types of pulses provided at the output of the system, the intensity of the primary source of primary information is increased in prior art systems and methods.

SUMMARY OF THE INVENTION

The principal object of the present invention is to provide a new and improved system for and method of generating a random independent sequence of two types of pulses. The system and method of the present invention overcome the disadvantages of systems and methods of similar types of the prior art. The system and method of the present invention avoids the loss of information during the blocking interval and avoids making an unsatisfactory ratio between the blocking interval and the counting interval more unsatisfactory as the repetition frequency of the sequence of pulses provided at the output of the system increases. The system of the present invention utilizes considerably less expensive and less voluminous apparatus than the similar two channel systems of the prior art by eliminating a source of primary information, a wideband, high gain, low noise amplifier and a high frequency pulse shaper of the type of the Schmitt trigger, which components are necessary in such prior art systems. The system of the present invention functions efficiently, effectively and reliably. In the system of the present invention, the probability of occurrence of a pulse of one type is the same as the probability of occurrence of a pulse of the other types, so that the probability of occurrence of a type of pulse is 0.5 or 50%. In the system of the present invention, the binary sequence of two types of pulses is derived from a single source of primary information. In the system of the present invention, a first channel provides a random independent sequence of two types of pulses with the same probability, and a second channel provides a random independent sequence of two types of pulses with the same probability independently from the first channel. The two channels may be combined in the system of the present invention into a single channel to provide a random independent sequence of pulses having twice the frequency or repetition rate of the pulse sequence of the first and second channels. In the system of the present invention, the sequence of counting and blocking intervals of one channel is shifted in phase relative to the sequence of counting and blocking intervals of another channel to provide a continuous information output.

In accordance with the present invention, a system for generating a random independent sequence of two types of pulses comprises a first branch for providing a random binary sequence of two types of pulses at a determined repetition rate. A second branch provides a random binary sequence of two types of pulses at the determined repetition rate. The first and second branches are in parallel relation with each other. A switch interconnects the first and second branches in a manner whereby in one operating condition of the switch each of the first and second branches functions independently of the other to provide corresponding random binary sequences of two types of pulses and in another operating condition of the switch the first and second branches are combined to provide a random binary sequence of two types of pulses at twice the determined repetition rate.

The first branch comprises a first pulse generator input circuit having an input and an output and a first pulse generator output parameter adjustor circuit having an input connected to the output of the first pulse generator input circuit and an output for providing a random binary sequence of two types of pulses at the determined repetition rate. The second branch comprises a second pulse generator input circuit having an input and an output and a second pulse generator output parameter adjustor circuit having an input connected to the output of the second pulse generator input circuit and and an output for providing a random binary sequence of two types of pulses at the determined repetition rate. A single source of primary information has an output connected to the input of the first pulse generator input circuit and an output connected to the input of the second pulse generator input circuit and supplies information to each of the first and second pulse generator input circuits.

The switch is interposed between the output of the second pulse generator input circuit and the input of each of the first and second pulse generator output parameter adjustor circuits and comprises a switch arm movable about a contact connected to the output of the second pulse generator input circuit. A first electrical contact is connected to the input of the second pulse generator output parameter adjustor circuit. A second electrical contact is connected to the input of the first pulse generator output parameter adjustor circuit. The first and second electrical contacts are spaced from each other. The switch arm is adapted to electrically contact the first electrical contact in the one operating condition thereof and to electrically contact the second electrical contact in the other operating condition thereof.

In accordance with the present invention, a method of generating a random independent sequence of two types of pulses comprises combining a plurality of channels each independently providing a random independent sequence of two types of pulses at a determined repetition rate to provide a random independent sequence of two types of pulses at twice the determined repetition rate. Each sequence of pulses is a random binary sequence of two types of pulses. The sequence of pulses provided by each of the channels is phase shifted relative to the sequence of pulses provided by each of the others of the channels to provide a continuous pulse in combining the channels. Information is supplied to each of the channels from a single source of information and the determined repetition rate varies as the intensity of the information.

BRIEF DESCRIPTION OF THE DRAWINGS

In order that the present invention may be readily carried into effect, it will now be described with reference to the accompanying drawings, wherein.

DESCRIPTION OF THE PREFERRED EMBODIMENT

Figure 1:
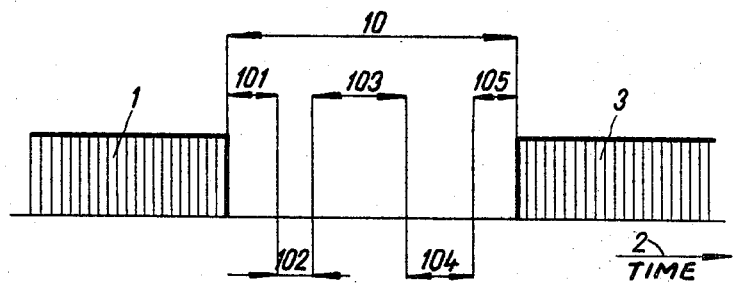
FIG. 1 is a schematic presentation of a pair of adjacent counting intervals or pulses separated or spaced by a blocking interval.

FIG. 1 is a time development of a pair of adjacent or successive counting intervals or pulses 1 and 3 spaced or separated by a blocking interval or blank space 10. The durations of the counting and blocking intervals 1, 3 and 10 are indicated along a time axis 2. The blocking or blanking interval 10 comprises a first safety interval 101. An evaluating interval 102 for a counting circuit next succeeds and is adjacent the first safety interval 101 in following relationship. A second safety interval 103 next succeeds and is adjacent the evaluating interval 102 in the following relationship. A clearing or reset interval 104 next succeeds and is adjacent the second safety interval 103 in the following relationship. A third safety interval 105 next succeeds and is adjacent the reset interval 104 in following relationship. The next following counting interval or pulse 3 is adjacent the third safety interval 105 in following relationship.

Figure 2:
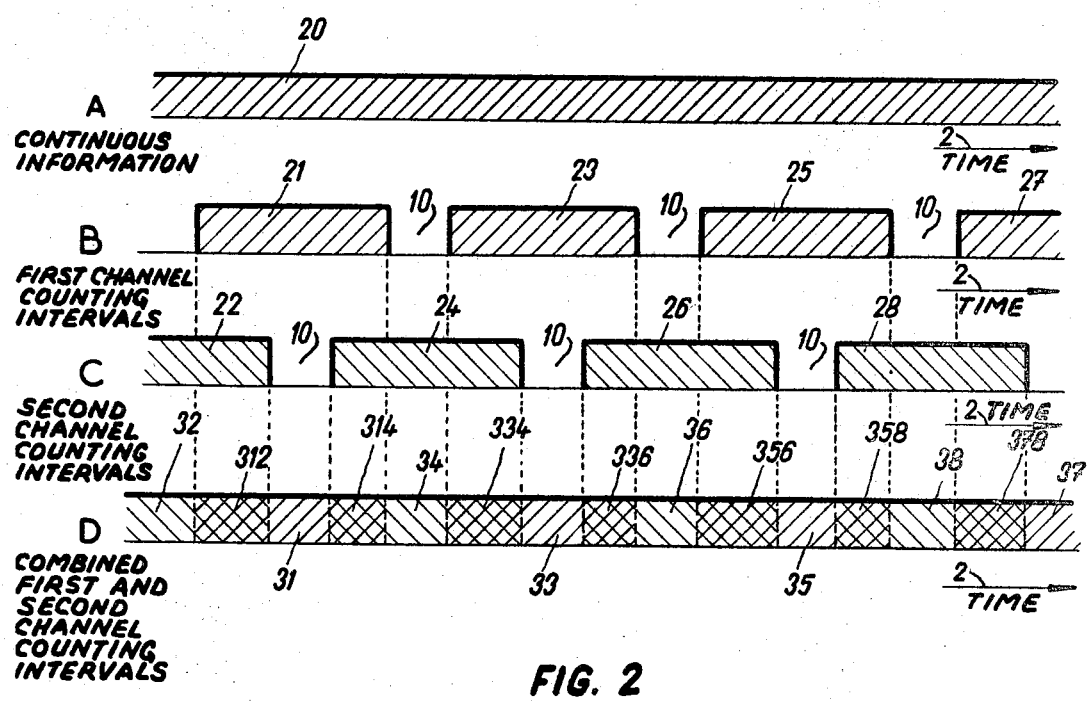
FIG. 2 is a schematic presentation of sequences of counting intervals or pulses and blocking intervals in the two channel system of the present invention for providing a random independent sequence of two types of pulses.

FIG. 2 is a plurality of time developments of the counting intervals or pulses and blocking intervals in the two channel system of the present invention for providing a random independent sequence of two types of pulses. The durations of the counting and blocking intervals are indicated along a time axis 2. In FIG. 2, curve A indicates continuous information or primary information, data or intelligence 20. The information 20 is provided by a source of primary information (400 in FIG. 4 and 501 in FIG. 5). Curve B indicates the counting intervals or pulses in the first channel. In curve B, counting pulses 21, 23, 25, 27, and so on, of equal time duration, are spaced or separated by interposed blocking intervals 10 of equal time duration.

Curve C of FIG. 2 indicates the counting intervals or pulses in the second channel. In curve C, counting pulses 22, 24, 26, 28, and so on, of equal time duration, are spaced or separated by interposed blocking intervals 10 of equal time duration. Curve D of FIG. 2 indicates the combined counting intervals of the first and second channels. In curve D, portions 31, 33, 35, 37, and so on, are portions of the counting intervals 21, 23, 25, 27, and so on, of the first channel and portions 32, 34, 36, 38, and so on, are portions of the counting intervals 22, 24, 26, 28, and so on, of the second channel. Portions 312, 314, 334, 336, 356, 358, 378, and so on, of curve D are overlapping portions of counting pulses 21 and 22, 21 and 24, 23 and 24, 23 and 26, 25 and 26, 25 and 28, 27 and 28, and so on.

As illustrated by curves B and C, the counting intervals 21, 23, 25 and 27 of the first channel alternate with the counting intervals 22, 24, 26 and 28 of the second channel. The duration of each counting interval of the first and second channels is equal and the duration of each blocking interval of the first and second channels is equal.

Figure 3:
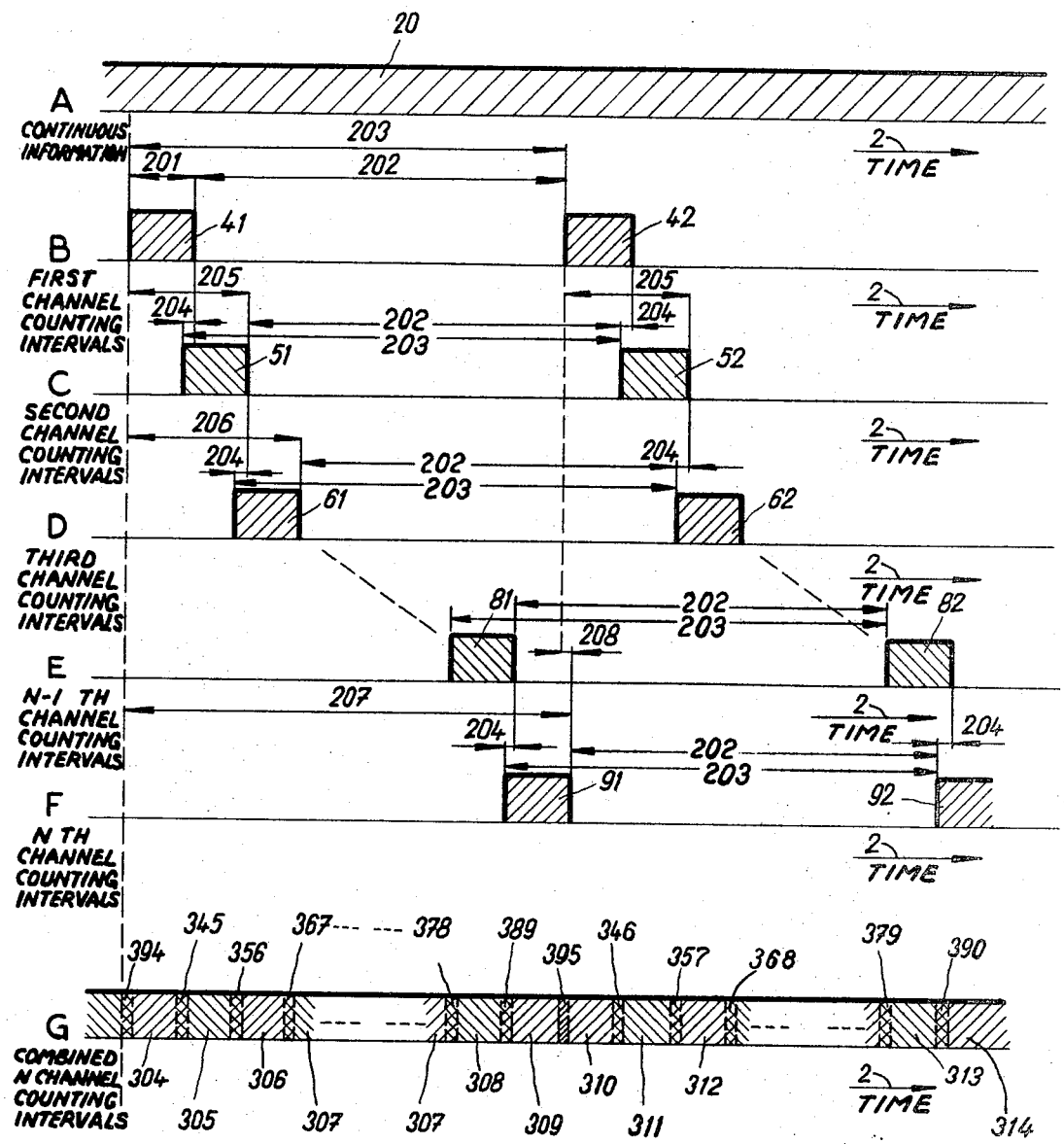
FIG. 3 is a schematic presentation of sequences of counting intervals or pulses and blocking intervals in the multichannel systems of the present invention for providing a random independent sequence of two types of pulses, the counting interval is of considerably shorter duration than the blocking or spacing interval.

FIG. 3 is a plurality of time developments of the counting intervals and blocking intervals in the multichannel system for providing a random independent sequence of two types of pulses. The counting interval of each channel is considerably shorter in duration than the blocking interval. The duration of the counting and blocking intervals are indicated along a time axis. In FIG. 3, curve A indicates continuous information or primary information, data or intelligence 20 which is provided by a source of primary information (400 in FIG. 4 and 501 in FIG. 5). Curve B indicates the counting intervals or pulses in the first channel. In curve B, counting pulses 41, 42, and so on, of equal time duration, are spaced or separated by interposed blocking intervals 202 of equal time duration.

Curve C of FIG. 3 indicates the counting intervals or pulses in the second channel. In curve C, counting pulses 51, 52, and so on, of equal time duration, are spaced or separated by interposed blocking intervals 202 of equal time duration. Curve D of FIG. 3 indicates the counting intervals or pulses in the third channel. In curve D, counting pulses 61, 62, and so on, of equal time duration, are spaced or separated by interposed blocking intervals 202 of equal time duration.

Curve E of FIG. 3 indicates the counting intervals or pulses in the $n-1$st channel. In curve E, counting pulses 81, 82, and so on of equal time duration, are spaced by interposed blocking intervals 202 of equal time duration. Curve F of FIG. 3 indicates the counting intervals or pulses in the $n$th channel. In curve F, counting pulses 91, 92, and so on, of equal time duration, are spaced or separated by interposed blocking intervals 202 of equal time duration. Curve G of FIG. 3 indicates the combined counting intervals of the $n$ channels. The counting intervals of all the channels have the same time duration and the blocking intervals of all the channels have the same time duration.

In each of the channels, the period 203, which is equal in each channel, is the pulse period or reciprocal of the pulse frequency or repetition rate. The period 203 is thus equal to the reciprocal of the frequency of the counting and blocking interval. The counting intervals of each channel are phase shifted to the same extent relative to each other, so that the phase shift or time displacement 204 between the leading edge of a counting interval of a channel and the trailing edge of a corresponding counting interval of the next preceding channel is constant or equal. The phase shift or time displacement 204 between corresponding pulses of the different channels indicates an overlap between such corresponding pulses which is constant or equal, as indicated in FIG. 3 between the pulses 41 and 51 of curves B and C, the pulses 51 and 61 of curves C and D, the pulses 81 and 91 of curves E and F, the pulses 42 and 52 of curve B and C, the pulses 52 and 62 of curves C and D and the pulses 82 and 92 of curves E and F.

In curve B, the period 201 is the total duration from the leading edge of the pulse or counting interval 41 of the first channel to the trailing edge of said pulse. In curve C, the period 205 is the total duration from the leading edge of the pulse 41 of the first channel to the trailing edge of the corresponding pulse 51 of the second channel. In curve D, the period 206 is the total duration from the leading edge of the pulse 41 of the first channel to the trailing edge of the corresponding pulse 61 of the third channel. In curve F, the period 207 is the total duration from the leading edge of the pulse 41 of the first channel to the trailing edge of the corresponding pulse 91 of the $n$th channel. In curve F of FIG. 3, the duration 207 muct be longer, by a duration period or interval 208 (curve E) from the leading edge of the pulse 42 of the first channel to the trailing edge of the pulse 91 of the $n$th channel, than the period 203. Thus, if all the channels are combined in parallel, the counting intervals are continuously provided without interruption in time.

In curve G of FIG. 3, portions 304, 305, 306, and so on, and 308 and 309, are portions of the counting interval 41, 51, 61, and so on, and 81 and 91 of the first, second, third, $n-1$st and $n$th channels and portions 310, 311, 312, and so on, and 313 and 314, are portions of the counting intervals 42, 52, 62, and so on, and 82 and 92 of said channels. Portions 345, 356, 367, and so on, and 378 and 389, of curve G of FIG. 3 are overlapping portions of counting pulses 41 and 51, 51 and 61, 61 and the corresponding pulse of the fourth channel (not shown), the corresponding pulse of the $n-2$nd channel (not shown) and 81, and 81 and 91, and portions 346, 357, 368, and so on, and 379 and 390, of said curve are overlapping portions of counting pulses 42 and 52, 52 and 62, 62 and the corresponding pulse of the fourth channel (not shown), the corresponding pulse of the $n-2$nd channel (not shown) and 82, and 82 and 92. Each of the portions 345, 356, 357, and so on, 378, 389, 346, 357, 368, and so on, 379 and 390 is equal in duration to the time displacement, period or interval 204.

Portions 394 and 395 of curve G of FIG. 3 are overlapping portions of counting pulse 41 and the counting pulse of the next preceding cycle of the $n$th channel, and of counting pulses 42 and 91 of the first and $n$th channels. Each of the portions 394, 395 and so on, is equal in duration to the period or interval 208. The overlapping portions are periodically repeated at the same frequency as the repetition rate or frequency of the pulses or counting intervals. If the periods or intervals 204 and 208 have the same duration, the frequency of the overlapping portions becomes $n$ times the pulse repetition rate. The portions 304, 305, 306, and so on, are then also equal in duration. These relationships do not apply if the intervals 204 and 208 are not of equal duration. There are, of course, $n$ channels combined in parallel.

Figure 4:
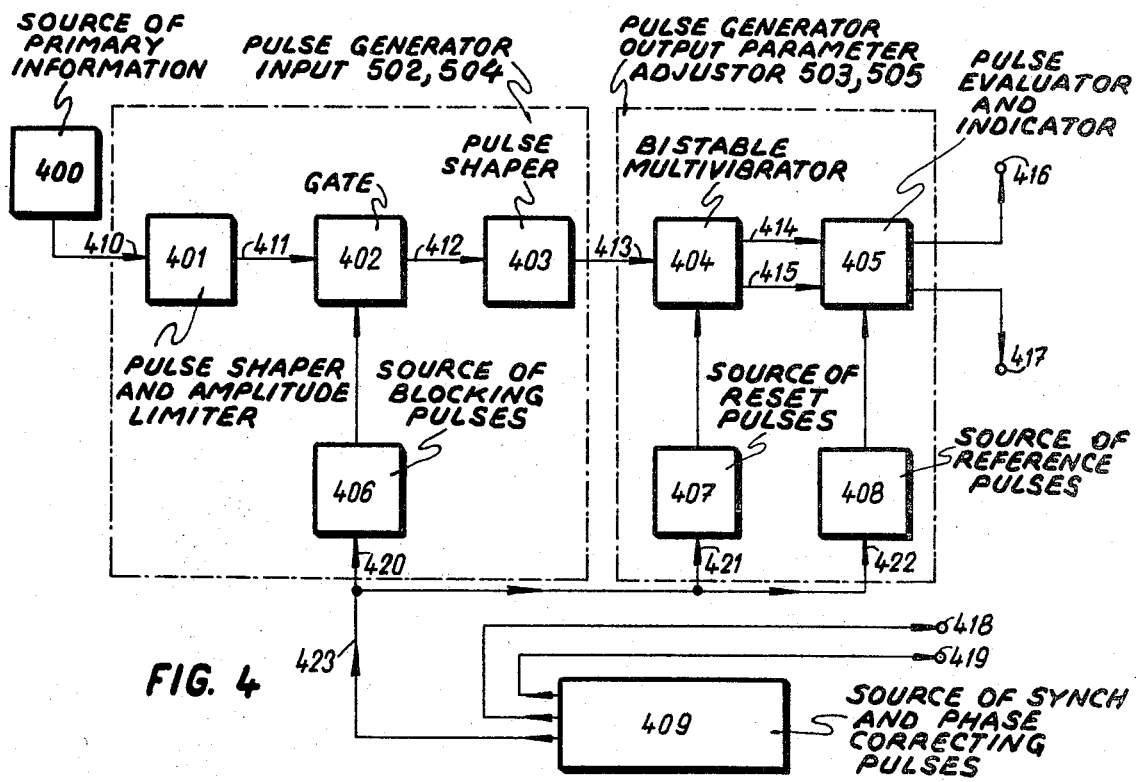
FIG. 4 is a schematic block diagram of a single channel system for providing a random independent sequence of two types of pulses.

FIG. 4 is a single channel system for providing a random independent sequence of two types of pulses. A source of primary information 400 supplies information or primary information to a pulse shaper and amplitude limiter 401 via a lead 410. The course of primary information 400 may comprise any suitable source of information such as, for example, a semiconductor diode and a low noise, wideband amplifier which amplifies noise in said diode. The pulse shaper and amplitude limiter 401 may comprise any suitable circuit arrangement for shaping information supplied by the source 400 and for limiting the amplitude of such information to a determined magnitude.

The output of the pulse shaper and amplitude limiter 401 is connected to an input of a gate 402 via a lead 411. The output of the gate 402 is connected to the input of a pulse shaper 403 via a lead 412. The conductivity condition of the gate 402 is controlled by blocking pulses from a source of blocking pulses 406 which has an output connected to another input of said gate. The gate 402 may comprise any suitable circuit for controlling the transfer of a signal from one input to the output under the control of a signal supplied to a second input. A suitable gate 402 may comprise, for example, a double cathode follower. The pulse shaper 403 may comprise any suitable circuit arrangement for shaping a pulse, signal or information. The source of blocking pulses 406 may comprise any suitable source of control signals. A suitable pulse shaper and amplitude limiter 401 and pulse shaper 402 may comprise, for example, any suitable combination of circuits shown and described in pages 142 to 154 of a textbook entitled "Directory of Electronic Circuits" by Matthew Mandl, Prentice-Hall, Inc., Englewood Cliffs, N.J. 1966. The circuit arrangement comprising the components 401, 402, 403 and 406 functions as the pulse generator input of the system and such pulse generator input appears in FIG. 5 as the pulse generator input 502 and as the pulse generator input 504. The circuit arrangement comprising the components 401, 402, 403 and 406 is disclosed in greater detail in the Czechoslovakian Patent No. 112,151 of the present inventor.

The output pulses produced by the pulse generator input 502 or 504 are supplied to the input of a bistable multivibrator 404, since the output of the pulse shaper 403 is connected to said input via a lead 413. The bistable multivibrator 404 may comprise any suitable bistable multivibrator or flip flop circuit which functions as a counter. A suitable flip flop circuit may comprise, for example, that shown in FIG. 12–6 and described in pages 179 to 181 of a textbook entitled "Directory of Electronic Circuits" by Matthew Mandl, Prentice-Hall, Inc., Englewood Cliffs, N.J., 1966. The flip flop 404 is reset by reset pulses supplied to its reset input by a source of reset pulses 407 having an output connected to said reset input.

The set and reset outputs of the bistable multivibrator 404 are connected to inputs of a pulse evaluator and indicator 405 via leads 414 and 415. A source of reference pulses 408 has an output connected to an input of the pulse evaluator and indicator 405 and supplies reference pulses to said indicator. Each of the sources of reset pulses 407 and the source of reference pulses 408 may comprise any suitable source of control signals such as, for example, a clock circuit or clock generator. The pulse evaluator and indicator 405 functions to compare the pulses supplied to it by the bistable multivibrator 404 in occurrence with the reference pulses supplied to it by the source 408 and to thereby evaluate the number of pulses or counting intervals, for example, with regard to whether or not this number is odd or even. Any suitable comparator circuit may be utilized for evaluating the pulses in the indicator 405.

The pulse evaluator and indicator 405 also functions to indicate the results of the pulse evaluation by providing binary signals in accordance with such evaluation. Thus, if the number of evaluated pulses during a counting interval is odd, a signal O may be produced and if the number of evaluated pulses is even a signal 1 is produced any suitable binary converter may be utilized for indicating the evaluated pulses in the indicator 405. The "0" output signal provided by the indicator 405 may be provided in an output lead 416 of said indicator and the signals in said output lead constitute a random independent sequence of a first type of pulses, or odd pulses. The "1" output signal provided by the indicator 405 may be provided in an output lead 417 of said indicator and the signals in said output lead constitute a random independent sequence of a second type of pulses, or even pulses.

A source of synch and phase correcting pulses 409, which may comprise any suitable source of synchronizing or phasing signals such as, for example, a clock circuit or clock generator, supplies synch and phase correcting signals to the source of blocking pulses 406 via a lead 423 and a lead 420, to the source of reset pulses 407 via the lead 423 and a lead 421 and to the source of reference pulses 408 via the lead 423 and a lead 422. Synchronizing and phasing signals may be supplied to other channels via leads 418 and 419.

Figure 5:
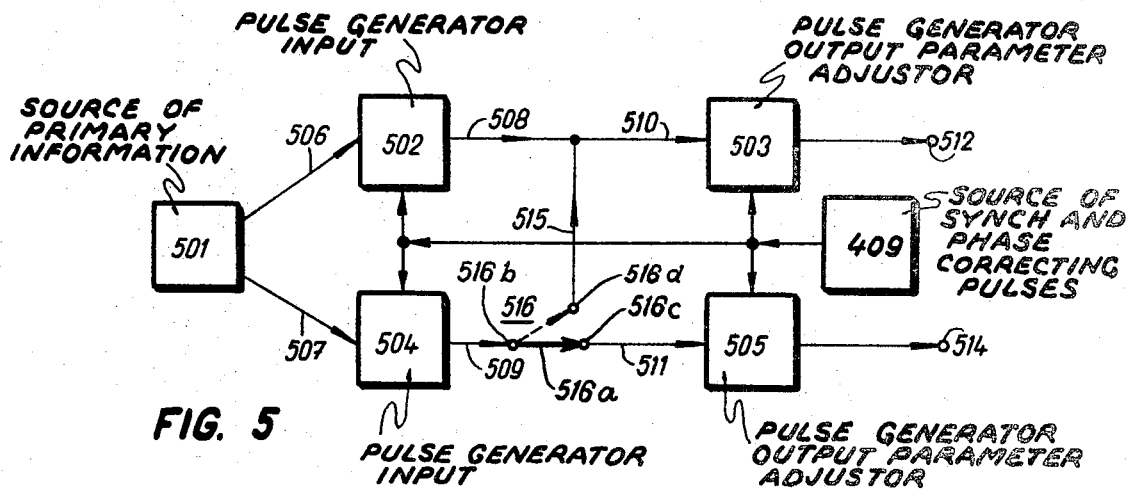
FIG. 5 is a schematic block diagram of an embodiment of the multichannel system of the present invention, showing two channels, for providing a random independent sequence of two types of pulses.

The circuit arrangement comprising the components 404, 405, 407 and 408, functions as the pulse generator output parameter adjuster of the system and such pulse generator output appears in FIG. 5 as the pulse generator output parameter adjustor 503 and as the pulse generator output parameter adjustor 505. The circuit arrangement comprising the components 404, 405, 407 and 408 is disclosed in greater detail in the Czechoslovakian Pat. No. 106,564 of the present inventor.

FIG. 5 is a multichannel system, of which two channels are shown, of the present invention for providing a random independent sequence of two types of pulses. The system of FIG. 5 comprises a plurality of branches, of which two are shown, in parallel relation. Each branch represents a channel. Information is supplied to each of the branches of the system by a source of primary information 501 which is the same as the source of primary information 400 of FIG. 4. The information, primary information, intelligence or data is supplied to the first branch via a lead 506 and to the second branch via a lead 507.

Each branch of the system of the present invention, as shown in FIG. 5, is the same as the system of FIG. 4.

The first branch thus comprises the pulse generator input 502 and the pulse generator output parameter adjustor 503. Information from the source of primary information 501 is supplied to the input of the pulse generator input 502 via the lead 506 and the output of said pulse generator input is connected to the input of the pulse generator output parameter adjustor 503 via leads 508 and 510. The output of the pulse generator output parameter adjustor 503 is connected to an output terminal 512 at which are provided a random binary sequence of two types of pulses comprising, for example, a sequence of "0" signals, pulses or counting intervals and a sequence of "1," signals, pulses or counting intervals in the manner described with reference to FIG. 4.

The second branch comprises the pulse generator input 504 and the pulse generator output parameter adjustor 505. Information from the source of primary information 501 is supplied to the input of the pulse generator input 504 via the lead 507 and the output of said pulse generator input is connected to the input of the pulse generator output parameter adjustor 505 via leads 509 and 511. The output of the pulse generator output parameter adjustor 505 is connected to an output terminal 514 at which is provided a random binanry sequence of two types of pulses comprising, for example, a sequence of "0" signals, pulses or counting intervals and a sequence of "1" signals, pulses or counting intervals in the manner described with reference to FIG. 4.

A two-position switch 516 has a switch arm 516a movable about an electrical contact 516b connected to the output of the pulse generator input 504 via the lead 509. The switch 516 also has a first electrical contact 516c connected to the input of the pulse generator output parameter adjustor 505 via the lead 511 and a spaced second electrical contact 516d connected to the input of the pulse generator output parameter adjustor 503 via a lead 515 and the lead 510. In a system having a plurality of channels, and therefore a plurality of branches, the different branches are interconnected by a suitable switching arrangement for maintaining the different branches in independent operation in one operating condition, operating position or switching position or condition of the switching arrangement and for combining the outputs of the pulse generator inputs of all the branches and supplying the combined outputs to the input of the pulse generator output parameter adjustor of one of the branches in another operating condition or position or switching position or condition of said switching arrangement.

In one position of the switch 516, in which the switch arm 516a is in electrical contact with the first contact 516c, as shown by solid line in FIG. 5, the first and second branches are disconnected from each other and operate independently from each other. In another position of the switch 516, in which the switch arm 516a is in electrical contact with the second contact 516d, as shown by broken lines in FIG. 5, the first and second branches are connected to each other by connecting the outputs of the pulse generator inputs 502 and 504 in common via the lead 508 and the lead 509, the switch arm 516a and the lead 515. The combined outputs of the pulse generator inputs 502 and 504 are supplied to the input of the pulse generator output parameter adjustor 503 via the lead 510.

In the second position of the switch 516, therefore, the outputs of both the first and second channel pulse generator inputs 502 and 504 are supplied to the first channel pulse generator output parameter adjustor 503, and the second channel pulse generator output parameter adjustor 505 is disconnected from the circuit. There is thus no output at the output terminal 514, and a random binary sequence of two types of pulses having twice the frequency or repetition rate of the sequence of pulses produced by a single channel is provided at the output terminal 512. The sequence of pulses provided at the output terminal 512 is similar to curve D of FIG. 2 and provide the advantages hereinbefore described with reference to the system of the present invention and with reference to FIGS. 2 and 3.

The source of synch and phase correcting pulses 409 of FIG. 5 is the same as that of FIG. 4 and functions in the same manner. In a multichannel system, $n$ branches, each corresponding to a channel are provided, similarly to the two branches shown in FIG. 5, with a switching arrangement interconnecting the branches in the manner hereinbefore described. A two channel system is shown in FIG. 5, since such a system is more clearly illustrated than a multichannel system and is much more utilizable than a multichannel system. A multichannel system comprising more than two channels is of advantage only when the duration of the blocking interval is considerably longer than the duration of the counting interval, as shown in FIG. 3. When the duration of the counting interval is considerably longer than the duration of the blocking interval, as shown in FIG. 2, a system comprising more than two channels having a maximum repetition rate would be unsuitable.

The system and method of the present invention eliminate the aforementioned disadvantages of the known systems and methods, which disadvantages are the loss of information during the blocking interval and further unsuitability of an unsuitable ratio of blocking to counting interval with increasing output pulse repetition rate. In accordance with the present invention, at least one additional channel is added to a single channel system. Furthermore, the sequence of counting or pulse intervals P2 and blocking intervals B2 of the second channel is phase shifted relative to the counting or pulse intervals P1 and blocking intervals B1 of the first channel in such a manner that a continuous information is provided.

For the first and second channels to be independent from each other, it is necessary that each of said channels have sufficient information or primary information which is not in the other channels. Thus, the first channel would have to have information in the blocking intervals B2 of the second channel and the second channel would have to have information in the blocking intervals B1 of the first channel.

In order for the counting or pulse interval to be sufficiently long, the repetition rate or frequency must be limited by the intensity of the information or primary information from the source of information. Thus, $$P_{min}=f(\lambda)$$

wherein $P_{min}$ is the minimum duration of the pulse or counting interval and $\lambda$ is the intensity of information from the source of information or primary information.

In order that the channels be independent from each other, it is necessary that each channel have information during the period of the blocking interval of another or other of the channels. This requirement is satisfied in the situation hereinbefore discussed with reference to FIG. 2, since the durations of the counting and blocking intervals are controlled and the counting and blocking intervals of the different channels are controlled in phase relative to each other.

The channels of the system and method of the present invention remain independent from each other even when the repetition rate is considerably smaller than the maximum repetition rate. This is due to the utilization of a single source of information or primary information, and is an advantage of the system and method of the present invention. The ratio of counting interval durations P1 and P2 or overlapping is insignificant, since the system and method continuously provide only two types of pulses, either even or odd, or "1" or "0." If the additional or second channel or channels include sufficient additional information, the output sequence of pulses provided by the system is determined by such additional information.

Since the different channels of the system process the information in the same manner and provide outputs which are independent from each other, the system and method of the present invention permit different operations, as hereinbefore described. In one operation, as described, a single source of primary information provides two random independent sequences of "0" and "1" with pulse occurence probabilities equal to each other and to 0.5 or 50%. In another operation, as described, the different channels are combined into a single channel which provides a random independent sequence of "0" and "1" at a multiple of the repetition rate of each channel. Thus, as hereinbefore described, advantages are provided by the utilization of a single source of information or primary information in the system and method of the present invention.

The two channel or multichannel system of the present invention may operate in a manner in which the pulse intervals or counting intervals of the different channels are in phase with each other. Each of the channels functions in the same manner and the channels are combined to provide the proper operation under mutual control.

While the invention has been described by means of specific examples and in a specific embodiment, I do not wish to be limited thereto, for obvious modifications will occur to those skilled in the art without departing from the spirit and scope of the invention.

I claim:

1. A system for generating a random sequence of two types of pulses, comprising
   a first branch comprising a first pulse generator input circuit having an input and an output and a first pulse generator output parameter adjustor circuit having an input connected to the output of said first pulse generator input circuit and an output for providing a random binary sequence of two types of pulses at a determined repetition rate;
   a second branch for providing a random binary sequence of two types of pulses at said determined repetition rate, said first and second branches being in parallel relation with each other; and
   switch means interconnecting said first and second branches in a manner whereby in one operating condition of said switch means each of said first and second branches functions independently of the other to provide corresponding random binary sequences of two types of pulses and in another operating condition of said switch means said first and second branches are combined to provide a random binary sequence of two types of pulses at twice said determined repetition rate.

2. A system as claimed in claim 1, wherein said second branch comprises a second pulse generator input circuit having an input and an output and a second pulse generator output parameter adjustor circuit having an input connected to the output of said second pulse generator input circuit and an output for providing a random binary sequence of two types of pulses at said determined repetition rate.

3. A system as claimed in claim 2, further comprising a single primary source of information having a first output connected to the input of said first pulse generator input circuit and having a second output connected to the input of said second pulse generator input circuit for supplying information to each of said first and second pulse generator input circuits.

4. A system as claimed in claim 2, wherein said switch means is interposed between the output of said second pulse generator input circuit and the input of each of said first and second pulse generator output parameter adjustor circuits.

5. A system as claimed in claim 2, wherein said switch means comprises a switch arm movable about a contact connected to the output of said second pulse generator input circuit, a first electrical contact connected to the input of said second pulse generator output parameter adjustor circuit and a second electrical contact connected to the input of said first pulse generator output parameter adjustor circuit, said first and second electrical contacts being spaced from each other, said switch arm being adapted to electrically contact said first electrical contact in said one operating condition thereof and to electrically contact said second elctrical contact in said other operating condition thereof.

References Cited

UNITED STATES PATENTS 3,226,648   12/1965   Davidson _____ 328—74 XR

DONALD D. FORRER, Primary Examiner

J. ZAZWORSKY, Assistant Examiner

U.S. Cl. X.R.

307—260, 271; 328—20, 62